(12) United States Patent
Matsubara et al.

(10) Patent No.: US 12,322,803 B2
(45) Date of Patent: Jun. 3, 2025

(54) SECONDARY BATTERY

(71) Applicant: Panasonic Intellectual Property Management Co., Ltd., Osaka (JP)

(72) Inventors: Kenji Matsubara, Osaka (JP);
Nobuhiko Hojo, Osaka (JP);
Masanobu Takeuchi, Osaka (JP);
Atsushi Fukui, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 586 days.

(21) Appl. No.: 17/439,996

(22) PCT Filed: Jan. 15, 2020

(86) PCT No.: PCT/JP2020/000982
§ 371 (c)(1),
(2) Date: Sep. 16, 2021

(87) PCT Pub. No.: WO2020/195025
PCT Pub. Date: Oct. 1, 2020

(65) Prior Publication Data
US 2022/0173399 A1 Jun. 2, 2022

(30) Foreign Application Priority Data
Mar. 26, 2019 (JP) .................. 2019-058635

(51) Int. Cl.
H01M 4/62 (2006.01)
H01M 4/02 (2006.01)
H01M 4/133 (2010.01)
H01M 4/587 (2010.01)
H01M 10/36 (2010.01)
H01M 10/42 (2006.01)

(52) U.S. Cl.
CPC .......... H01M 4/621 (2013.01); H01M 4/133 (2013.01); H01M 4/587 (2013.01); H01M 10/36 (2013.01); H01M 10/4235 (2013.01); H01M 2004/027 (2013.01); H01M 2300/0002 (2013.01)

(58) Field of Classification Search
None
See application file for complete search history.

(56) References Cited

U.S. PATENT DOCUMENTS

| | | |
|---|---|---|
| 2013/0224608 A1 | 8/2013 | Sasaki et al. |
| 2017/0279159 A1* | 9/2017 | Suyama .............. H01M 4/5825 |
| 2017/0373351 A1 | 12/2017 | Kawai et al. |
| 2018/0123171 A1 | 5/2018 | Takechi et al. |
| 2019/0044190 A1 | 2/2019 | Yamada et al. |
| 2019/0296325 A1 | 9/2019 | Sekiguchi et al. |

FOREIGN PATENT DOCUMENTS

| | | | |
|---|---|---|---|
| JP | 9-50809 A | | 2/1997 |
| JP | 11354104 A | * | 12/1999 |
| JP | 2001006683 A | * | 1/2001 |
| JP | 2007-109549 A | | 4/2007 |
| JP | 2018-73819 A | | 5/2018 |
| JP | 6423453 B2 | | 11/2018 |
| JP | 2019-169355 A | | 10/2019 |
| WO | 2012/081348 A1 | | 6/2012 |
| WO | 2017/122597 A1 | | 7/2017 |

OTHER PUBLICATIONS

Machine Translation of JP 2001006683A (Year: 2001).*
Suo et al.; "Water-in-salt" electrolyte enables high-voltage aqueous lithium-ion chemistries; sciencemag.org, pp. 938-943. (Year: 2015).*
Machine Translation of JP JP11354104A (Year: 1999).*
www.scifinder.com CAS Reg No. 90076-65-6 (Year: unknown).*
International Search Report dated Mar. 24, 2020, issued in counterpart International Application No. PCT/JP2020/000982 (2 pages).
English translation of Search Report dated Dec. 27, 2023, issued in counterpart CN Application No. 202080024189.1. (3 pages).

* cited by examiner

*Primary Examiner* — Gregg Cantelmo
(74) *Attorney, Agent, or Firm* — WHDA, LLP

(57) ABSTRACT

A secondary battery according to the present invention is provided with a positive electrode, a negative electrode and an electrolyte solution; the electrolyte solution contains water and a lithium salt; the negative electrode contains a negative electrode active material; a silane coupling agent, which is reductively decomposed at a potential that is higher than the reductive decomposition potential of water, is adhered to the surface of the negative electrode active material; and the silane coupling agent contains fluorine as a constituent element.

17 Claims, 1 Drawing Sheet

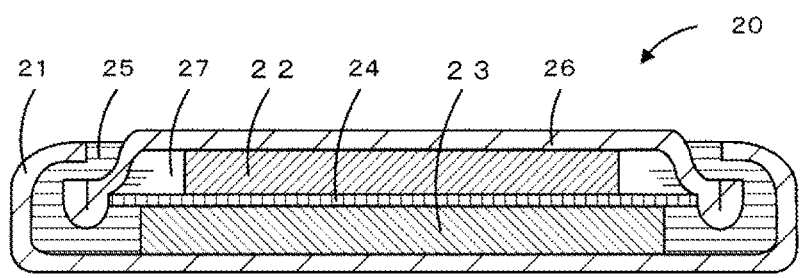

SECONDARY BATTERY

TECHNICAL FIELD

The present disclosure relates to a secondary battery.

BACKGROUND

As a secondary battery with high output and high energy density, a lithium ion secondary battery is widely used, which includes a positive electrode, a negative electrode, and an electrolyte solution and which performs charging/discharging by moving lithium ions between the positive electrode and the negative electrode. In conventional secondary batteries, an organic-solvent-based electrolyte solution is used in order to achieve a high energy density.

However, organic solvents are generally flammable, so that ensuring safety is an important existing issue. Another problem is that ion conductivity of an organic solvent is lower than that of an aqueous solution, so that rapid charge/discharge characteristics are not sufficiently attained.

In view of the above problems, studies are being conducted on secondary batteries using an electrolyte solution containing water. However, a secondary battery using an electrolyte solution containing water has a narrow potential window, and has difficulties in operating stably under a high voltage.

As one method for solving the problem that the potential window is narrow, for example, Patent Documents 1 and 2 disclose using, as an aqueous electrolyte solution for a secondary battery, an aqueous solution containing an alkaline salt at a high concentration. Further, Patent Document 3 discloses using an electrolyte solution obtained by adding an organic carbonate to an aqueous solution containing an alkaline salt at a high concentration.

CITATION LIST

Patent Literature

Patent Document 1: JP 6423453 B
Patent Document 2: WO 2017/122597 A
Patent Document 3: JP 2018-73819 A

SUMMARY

However, in order to further increase the voltage and achieve stable operation in a secondary battery using an aqueous electrolyte solution, it is necessary to extend the potential window on the reduction side so as to suppress self-discharge.

Therefore, an object of the present disclosure is to extend the potential window on the reduction side so as to suppress battery self-discharge in a secondary battery using an aqueous electrolyte solution.

A secondary battery according to a first aspect of the present disclosure includes a positive electrode, a negative electrode, and an electrolyte solution. The electrolyte solution contains water and a lithium salt. The negative electrode includes a negative electrode active material, and to a surface of the negative electrode active material, a silane coupling agent is adhered, which contains fluorine as a constituent element and which is reductively decomposed at a potential higher than a reductive decomposition potential of water.

Further, a secondary battery according to a second aspect of the present disclosure includes a positive electrode, a negative electrode, and an electrolyte solution. The electrolyte solution contains water and a lithium salt. The negative electrode includes a negative electrode active material, and on a surface of the negative electrode active material, a coating is formed by reductive decomposition of a silane coupling agent which contains fluorine as a constituent element and which is reductively decomposed at a potential higher than a reductive decomposition potential of water.

According to a secondary battery according to the present disclosure, the potential window on the reduction side can be extended.

BRIEF DESCRIPTION OF DRAWINGS

FIG. 1 is a schematic cross-sectional view showing an example secondary battery according to an embodiment.

DESCRIPTION OF EMBODIMENTS

In general, reductive decomposition of an aqueous electrolyte solution (which substantially is reductive decomposition of water) occurs in a range of potential, as determined with reference to Li, from about 2 V to a potential lower than 2V, and a charging/discharging reaction of a negative electrode active material such as a carbon material occurs at a potential further lower than the reductive decomposition potential of water. Accordingly, during a charging process, before the charging reaction of the negative electrode active material takes place, reductive decomposition of water occurs and the charging current is consumed by this reaction, so that the progress of the charging reaction of the negative electrode active material is hindered. According to the findings of the present inventors, in order to suppress reductive decomposition of the aqueous electrolyte solution and extend the potential window on the reduction side, it is important to suppress electrochemical activity at the surface of the negative electrode active material. As a result of diligent studies, the present inventors discovered that a silane coupling agent can suppress electrochemical activity at the surface of the negative electrode active material and suppress reductive decomposition of the aqueous electrolyte solution. The present inventors therefore came to devise a secondary battery having aspects described below.

A secondary battery of a first aspect of the present disclosure comprises a positive electrode, a negative electrode, and an electrolyte solution. The electrolyte solution contains water and a lithium salt. The negative electrode includes a negative electrode active material, and to a surface of the negative electrode active material, a silane coupling agent is adhered, which contains fluorine as a constituent element and which is reductively decomposed at a potential higher than the reductive decomposition potential of water. In the secondary battery of the first aspect of the present disclosure, during a charging process, before the water in the electrolyte solution undergoes reductive decomposition, the silane coupling agent is reductively decomposed, and a coating derived from the silane coupling agent is formed on the surface of the negative electrode active material. This coating is an electrochemically stable coating. Since a water-resistant coating having a high ratio of low-solubility component can be formed by including fluorine, subsequent reductive decomposition of water is suppressed, and the potential window of the secondary battery on the reduction side is extended. This makes it possible to, for example, increase the voltage of the secondary battery. It is noted that the coating derived from the silane coupling agent is formed during the initial charging process and is hardly formed during subsequent charge/discharge cycles.

Since the coating derived from the silane coupling agent has lithium-ion conductivity, lithium ions are occluded into and released from the negative electrode active material through the coating. In other words, the secondary battery according to one aspect of the present disclosure exhibits a charge/discharge reaction (i.e., a redox reaction) carried out by occluding and releasing lithium ions into and from the negative electrode active material. Further, since the coating is formed by reductive decomposition that occurs at a potential higher than the reductive decomposition potential of water, the coating formation does not occur in a manner competing with reductive decomposition of water, so that a dense coating can be formed. Furthermore, by including fluorine, a water-resistant coating having a high ratio of low-solubility component can be formed. For these reasons, according to the secondary battery of the present disclosure using the silane coupling agent, battery self-discharge is also suppressed.

As shown in Examples 1 and 2 described below, an increase in the length of fluoroalkyl chain results in further suppression of self-discharge, for the following reasons. By selecting a silane coupling agent having a higher fluorination ratio, the ratio of fluorine atoms in the coating can be increased, so that a coating having a higher electrochemical stability, a higher ratio of low-solubility component, and a higher water resistance can be formed, and it is thereby possible to enhance robustness of the coating in the aqueous electrolyte solution. The fluorination ratio is preferably 0.49 or higher, and more preferably 0.56 or higher.

Fluorination ratio (no unit)=(Amount of fluorine in constituent elements of silane coupling agent (g/mol)/(Molecular weight of silane coupling agent (g/mol))

A secondary battery of a second aspect of the present disclosure comprises a positive electrode, a negative electrode, and an electrolyte solution. The electrolyte solution contains water and a lithium salt. The negative electrode includes a negative electrode active material, and on a surface of the negative electrode active material, a coating is formed by reductive decomposition of a silane coupling agent which contains fluorine as a constituent element and which is reductively decomposed at a potential higher than a reductive decomposition potential of water. The secondary battery of the second aspect of the present disclosure is a secondary battery of an aspect assumed after the secondary battery of the first aspect of the present disclosure is charged or is charged and discharged. That is, the coating formed on the surface of the negative electrode active material is an electrochemically stable film. Further, since a water-resistant coating having a high ratio of low-solubility component can be formed by including fluorine, reductive decomposition of water is suppressed during the charging process, and the potential window of the secondary battery on the reduction side is extended.

Embodiments of the secondary battery according to the present disclosure will now be described in detail.

The shape of the secondary battery of the present embodiment is not particularly limited, and examples thereof include a coin type, a button type, a sheet type, a laminate type, a cylindrical type, a flat type, a square type, and so on. FIG. 1 is a schematic cross-sectional view showing an example secondary battery of the present embodiment. The secondary battery 20 shown in FIG. 1 comprises a cup-shaped battery housing 21, a positive electrode 22 provided in an upper part of the battery housing 21, a negative electrode 23 provided at a position facing the positive electrode 22 via a separator 24, a gasket 25 formed of an insulating material, and a sealing plate 26 which is disposed in the opening of the battery housing 21 and which seals the battery housing 21 via the gasket 25. In the secondary battery 20 shown in FIG. 1, an electrolyte solution 27 fills the space in which the positive electrode 22 and the negative electrode 23 are located. The electrolyte solution 27, the positive electrode 22, the negative electrode 23, and the separator 24 will be described below in detail.

The electrolyte solution 27 contains water and a lithium salt (hereinafter, the electrolyte solution 27 may be referred to as an aqueous electrolyte solution). Since the aqueous electrolyte solution contains water, which is non-flammable, as the main solvent, safety can be enhanced in the secondary battery using the aqueous electrolyte solution. In consideration of this point, the content of water in the electrolyte solution 27 relative to the total amount of the electrolyte solution 27 is preferably 6% by mass or higher, more preferably in a range from 8% by mass to 50% by mass, and even more preferably in a range from 8.5% by mass to 21% by mass.

The electrolyte solution 27 may contain a solvent other than water. Examples of the solvent other than water include ethers, carbonates, nitriles, alcohols, ketones, amines, amides, sulfur compounds, hydrocarbons, and the like. The content of the solvent other than water is preferably 50% by mass or lower, and more preferably 25% by mass or lower, relative to the total amount of the electrolyte solution 27.

As the lithium salt, any compound can be used so long as it dissolves and dissociates in a solvent containing water and causes lithium ions to be present in the aqueous electrolyte solution. The lithium salt preferably does not cause deterioration of the battery characteristics due to reaction with materials constituting the positive electrode and the negative electrode. Examples of such a lithium salt include: a salt formed from an inorganic acid such as perchloric acid, sulfuric acid, and nitric acid; a salt formed from a halide ion such as a chloride ion and a bromide ion; and a salt formed from an organic anion containing a carbon atom in the structure.

Examples of the organic anion constituting the lithium salt include anions represented by the following general formulas (i) to (iii).

$(R^1SO_2)(R^2SO_2)N^-$           (i)

($R^1$ and $R^2$ are respectively independently selected from an alkyl group or a halogen-substituted alkyl group. $R^1$ and $R^2$ may be bonded to each other to form a ring structure.)

$R^3SO_3^-$           (ii)

($R^3$ is selected from an alkyl group or a halogen-substituted alkyl group.)

$R^4CO_2^-$           (iii)

($R^4$ is selected from an alkyl group or a halogen-substituted alkyl group.)

In the above general formulas (i) to (iii), the number of carbon atoms in the alkyl group or the halogen-substituted alkyl group is preferably 1 to 6, more preferably 1 to 3, and even more preferably 1 to 2. Fluorine is preferable as the halogen of the halogen-substituted alkyl group. The number of halogen substitutions in the halogen-substituted alkyl group is less than or equal to the number of hydrogens in the original alkyl group.

Each of $R^1$ to $R^8$ is, for example, a group represented by the following general formula (iv).

$$C_nH_aF_bCl_cBr_dI_e \qquad \text{(iv)}$$

(n is an integer of 1 or greater, and a, b, c, d, and e are integers of 0 or greater that satisfy 2n+1=a+b+c+d+e.)

Specific examples of the organic anion represented by the above general formula (i) include bis(trifluoromethanesulfonyl)imide (TFSI; $[N(CF_3SO_2)_2]^-$), bis(perfluoroethanesulfonyl)imide (BETI; $[N(C_2F_5SO_2)_2]^-$), (perfluoroethanesulfonyl)(trifluoromethanesulfonyl)imide ($[N(C_2F_5SO_2)(CF_3SO_2)]^-$), and the like. Specific examples of the organic anion represented by the above general formula (ii) include $CF_3SO_3^-$, $C_2F_5SO_3^-$, and the like. Specific examples of the organic anion represented by the above general formula (iii) include $CF_3CO_2^-$, $C_2F_5CO_2^-$, and the like.

Examples of organic anions other than those of the above general formula (i) include anions of bis(1,2-benzenediolate (2-)—O,O')borate, bis(2,3-naphthalenedioleate(2-)—O,O')borate, bis(2,2'-biphenyldiolate(2-)—O,O')borate, bis(5-fluoro-2-olate-1-benzenesulfonate-O,O')borate, and the like.

As the anion constituting the lithium salt, preferably an imide anion is included in the salt, in consideration of extending the potential window on the reduction side. Specific preferred examples of the imide anion include bis(fluorosulfonyl)imide (FSI; $[N(FSO_2)_2]^-$), (fluorosulfonyl)(trifluoromethanesulfonyl)imide (FTI; $[N(FSO_2)(CF_3SO_2)]^-$), and the like, in addition to the imide anions listed above as the examples of the organic anion represented by the above general formula (i).

In consideration of extending the potential window on the reduction side, examples of the lithium salt having a lithium ion and an imide anion include lithium bis(trifluoromethanesulfonyl)imide (LiTFSI), lithium bis(perfluoroethanesulfonyl)imide (LiBETI), lithium (perfluoroethanesulfonyl)(trifluoromethanesulfonyl)imide, lithium bis(fluorosulfonyl)imide (LiFSI), lithium (fluorosulfonyl)(trifluoromethanesulfonyl)imide (LiFTI), and the like. These may be used alone or by combining two or more thereof.

Other specific examples of the lithium salt include $CF_3SO_3Li$, $C_2F_5SO_3Li$, $CF_3CO_2Li$, $C_2F_5CO_2Li$, lithium bis(1,2-benzenediolate(2-)—O,O')borate, lithium bis(2,3-naphthalenediolate)(2-)—O,O')borate, lithium bis(2,2'-biphenyldiolate(2-)—O,O')borate, lithium bis(5-fluoro-2-olate-1-benzenesulfonate-O,O')borate, lithium perchlorate ($LiClO_4$), lithium chloride (LiCl), lithium bromide (LiBr), lithium hydroxide (LiOH), lithium nitrate ($LiNO_3$), lithium sulfate ($Li_2SO_4$), lithium sulfide ($Li_2S$), lithium hydroxide (LiOH), and the like. These may be used alone or by combining two or more thereof.

The mixing ratio of the lithium salt and water in the electrolyte solution 27 is preferably 4 mol or less of water, and more preferably 3.5 mol or less of water, relative to 1 mol of the lithium salt, in consideration of extending the potential window on the reduction side. The lower limit value is not particularly defined so long as precipitation of the lithium salt does not occur and the charge/discharge reaction of the battery proceeds, but in terms of safety of the aqueous secondary battery, the lower limit value preferably is, for example, 1 mol or more of water relative to 1 mol of the lithium salt.

The positive electrode 22 comprises, for example, a positive electrode current collector and a positive electrode mixture layer formed on the positive electrode current collector. As the positive electrode current collector, it is possible to use a foil of a metal that is electrochemically and chemically stable in the potential range of the positive electrode, a film having the aforementioned metal disposed on a surface layer, and the like. The form of the positive electrode current collector is not particularly limited, and, for example, a porous member such as a mesh member, perforated sheet, or expanded metal made of the aforementioned metal may be used. As the material of the positive electrode current collector, it is possible to employ a known metal or the like that is usable for a secondary battery using an aqueous electrolyte solution. Examples of such a metal include stainless steel, Al, aluminum alloy, Ti, and the like. The thickness of the positive electrode current collector preferably is, for example, from 3 μm or greater to 50 μm or less, in consideration of current-collecting property, mechanical strength, and the like.

The positive electrode mixture layer contains a positive electrode active material. The positive electrode mixture layer may further contain a binder material, a conductive material, and the like.

Examples of the positive electrode active material include lithium (Li), as well as lithium transition metal oxides containing transition metal elements such as cobalt (Co), manganese (Mn), and nickel (Ni). Other positive electrode active materials include: transition metal sulfides; metal oxides; lithium-containing polyanionic compounds containing one or more transition metals, such as lithium iron phosphate ($LiFePO_4$) and lithium iron pyrophosphate ($Li_2FeP_2O_7$); sulfur-based compounds ($Li_2S$); and oxygen-containing metal salts of oxygen, lithium oxide, etc. The positive electrode active material is preferably a lithium-containing transition metal oxide, and preferably contains at least one of Co, Mn, and Ni as the transition metal element.

The lithium transition metal oxide may contain additive elements other than Co, Mn, and Ni, and may contain, for example, aluminum (Al), zirconium (Zr), boron (B), magnesium (Mg), scandium (Sc), yttrium (Y), titanium (Ti), iron (Fe), copper (Cu), zinc (Zn), chromium (Cr), lead (Pb), tin (Sn), sodium (Na), potassium (K), barium (Ba), strontium (Sr), calcium (Ca), tungsten (W), molybdenum (Mo), niobium (Nb), silicon (Si), and the like.

Specific examples of the lithium transition metal oxide include, for example, $Li_xCoO_2$, $Li_xNiO_2$, $Li_xMnO_2$, $Li_xCo_yNi_{1-y}O_2$, $Li_xCo_yM_{1-y}O_z$, $Li_xMn_2O_4$, $Li_xMn_{2-y}M_yO_4$, $LiMPO_4$, and $Li_2MPO_4F$ (in each of the chemical formulas, M is at least one of Na, Mg, Sc, Y, Mn, Fe, Co, Ni, Cu, Zn, Al, Cr, Pb, Sb and B; and $0<x\le1.2$, $0<y\le0.9$, and $2.0\le z\le2.3$ hold true). These lithium transition metal oxides may be used alone or by mixing a plurality thereof. In consideration of increasing the capacity, the lithium transition metal oxide preferably contains 80 mol % or more of Ni relative to the total amount of transition metals other than lithium. Further, in terms of crystal structure stability, the lithium transition metal oxide more preferably is $Li_aNi_bCo_cAl_dO_2$ (where $0<a\le1.2$, $0.8\le b<1$, $0<c<0.2$, $0<d\le0.1$, and b+c+d=1 hold true).

As the conductive material, a known conductive material that enhances electrical conductivity of the positive electrode mixture layer can be used, and examples thereof include carbon materials such as carbon black, acetylene black, Ketjen black, graphite, carbon nanofibers, carbon nanotubes, and graphene. These may be used alone or as a combination of two or more thereof. As the binder material, it is possible to use a known binder material that maintains a good state of contact between the positive electrode active material and the conductive material and that enhances the binding property of the positive electrode active material and the like to the surface of the positive electrode current collector. Examples thereof include fluororesins such as polytetrafluoroethylene (PTFE) and polyvinylidene fluoride (PVDF), polyacrylonitrile (PAN), polyimide, acrylic resin, polyolefin, carboxymethyl cellulose (CMC) or a salt thereof, styrene-butadiene rubber (SBR), polyethylene oxide (PEO), polyvinyl alcohol (PVA), polyvinylpyrrolidone (PVP), and the like.

The positive electrode 22 can be manufactured by, for example, applying a positive electrode mixture slurry containing the positive electrode active material, the binder material, the conductive material, and the like onto the positive electrode current collector, and drying and rolling the applied film, to thereby form the positive electrode mixture layer on the positive electrode current collector.

The negative electrode 23 comprises, for example, a negative electrode current collector and a negative electrode mixture layer formed on the negative electrode current collector. As the negative electrode current collector, it is possible to use a foil of a metal that is electrochemically and chemically stable in the potential range of the negative electrode, a film having the aforementioned metal disposed on a surface layer, and the like. The form of the negative electrode current collector is not particularly limited, and, for example, a porous member such as a mesh member, perforated sheet, or expanded metal made of the aforementioned metal may be used. As the material of the negative electrode current collector, it is possible to employ a known metal or the like that is usable for a secondary battery using an aqueous electrolyte solution. Examples of such a metal include Al, Ti, Mg, Zn, Pb, Sn, Zr, In, and the like. These may be used alone or as an alloy or the like of two or more thereof, so long as the material is mainly composed of at least one of these metals. Further, in cases where two or more elements are included, those elements may not necessarily be alloyed. The thickness of the negative electrode current collector preferably is, for example, from 3 μm or greater to 50 μm or less, in consideration of current-collecting property, mechanical strength, and the like.

The negative electrode mixture layer contains a negative electrode active material. To the surface of the negative electrode active material, a silane coupling agent is adhered, which will be described further below. The negative electrode mixture layer may further contain a binder material, a conductive material, and the like. As the conductive material and the binder material, the same materials as those used on the positive electrode side can be used.

As the negative electrode active material, it is possible to employ a known negative electrode active material that is usable for a secondary battery using a conventional non-aqueous electrolyte solution. Examples of such a negative electrode active material include carbonaceous materials such as natural graphite, artificial graphite, and amorphous carbon such as soft carbon and hard carbon. Still other examples include lithium-containing alloys and metal compounds such as metal oxide, metal sulfide, and metal nitride, silicon, and the like. Examples of the lithium-containing alloys include a lithium-aluminum alloy, a lithium-tin alloy, a lithium-lead alloy, a lithium-silicon alloy, and the like. Examples of the lithium-containing metal oxide include lithium titanate ($Li_4Ti_5O_{12}$, etc.) and the like. Examples of the lithium-containing metal nitride include lithium cobalt nitride, lithium iron nitride, lithium manganese nitride, and the like. Furthermore, sulfur-based compounds can also be mentioned as examples. These negative electrode active materials may be used alone or by combining two or more thereof. According to the secondary battery 20 of the present embodiment, since reduction of water is suppressed and the potential window on the reduction side is extended, application of carbon materials, lithium-tin alloy materials, lithium-silicon alloy materials, and the like as a negative electrode active material of a battery using an aqueous electrolyte solution is possible, while such presented difficulties conventionally.

The negative electrode 23 can be manufactured by, for example, applying a negative electrode mixture slurry containing the negative electrode active material, the binder material, and the like onto the negative electrode current collector, and drying and rolling the applied film, to thereby form the negative electrode mixture layer on the negative electrode current collector.

The silane coupling agent adhered to the surface of the negative electrode active material may be any silane coupling agent so long as it contains fluorine as a constituent element and is reductively decomposed at a potential higher than the reductive decomposition potential of water. Considering the ease of suppressing reductive decomposition of water, the reductive decomposition potential of the silane coupling agent as determined with reference to Li (i.e., with respect to Li/Li+) is preferably 2.1 V or higher, more preferably 2.2 V or higher, and even more preferably 2.4 V or higher. This is because such values are desirable for avoiding a competing progress of reductive decomposition of water and for providing a completely-covering dense coating before the reductive decomposition potential of water is reached. While the upper limit value is not particularly defined, it preferably is, for example, 3.0 V or less as determined with reference to Li. This is because a potential that does not cause oxidative dissolution of the negative electrode current collector is desirable.

As mentioned above, during the initial charging process of the secondary battery, the silane coupling agent is reductively decomposed before reductive decomposition of water takes place, and forms, on the surface of the negative electrode active material, a water-resistant coating which is electrochemically stable and which has a high ratio of low-solubility component due to inclusion of fluorine. As a result, reductive decomposition of water is suppressed in subsequent charging processes, so that the potential window on the reduction side is extended.

In consideration of enabling significant extension of the potential window on the reduction side, the silane coupling agent is preferably a fluoroalkylsilane which is reductively decomposed at a potential higher than the reductive decomposition potential of water. Specifically, a fluoroalkylsilane represented by the following formula is more preferable:

[Chemical Formula 1]

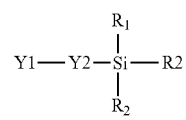

(wherein Y1 is a fluoroalkyl group having 5 to 10 carbon atoms and 11 to 21 fluorine atoms, may be linear or branched, and may include at least one of an ether bond, an ester bond, a peptide bond, a vinyl bond, a sulfonamide bond, and a hydrogen atom; Y2 is represented by $(CH_2)_n$ where n is an integer of 0 to 5, and may be linear or branched; and each of R1, R2 and R3 independently is an alkoxy group, an alkyl group, an amino group, a halogen atom, or a hydrogen atom).

An example of a fluoroalkylsilane in which Y1 is a fluoroalkyl group having a peptide bond is N-(3-trimethoxysilylpropyl)perfluorohexanamide.

[Chemical Formula 2]

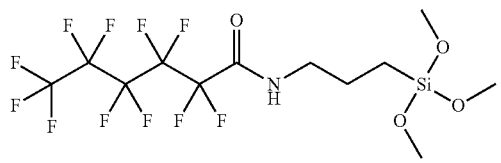

An example of a fluoroalkylsilane in which Y1 is a fluoroalkyl group having a vinyl bond is hexadecafluorododec-11-en-1-yltrimethoxysilane.

[Chemical Formula 3]

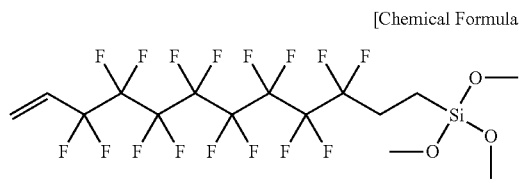

An example of a fluoroalkylsilane in which Y1 is a fluoroalkyl group having a sulfonamide bond is 3-perfluorooctylsulfonyl aminopropyltriethoxysilane.

[Chemical Formula 4]

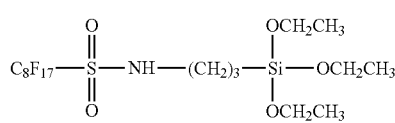

Examples of a fluoroalkylsilane in which Y1 is a fluoroalkyl group having a hydrogen atom include dedecylfluoroheptyl-propyltrimethoxysilane and dedecylfluoro-heptyl-propylmethyldimethoxysilane.

[Chemical Formula 5]

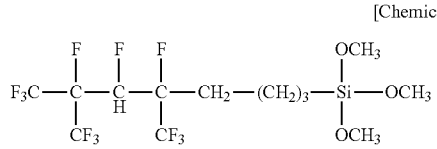

[Chemical Formula 6]

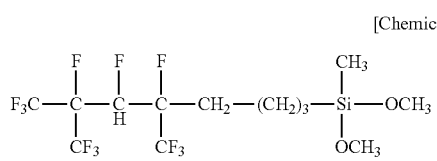

An example of a fluoroalkylsilane in which Y1 is a branched fluoroalkyl group is triethoxy[5,5,6,6,7,7,7-heptafluoro-4,4-bis(trifluoro-methyl)heptyl]silane.

[Chemical Formula 7]

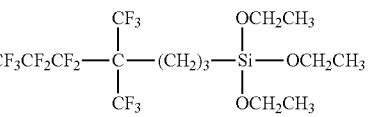

An example of a fluoroalkylsilane in which Y2 is branched is 4-methyl-(perfluorohexylethyl)propyltrimethoxysilane.

[Chemical Formula 8]

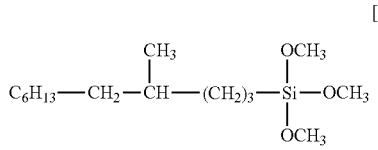

In consideration of enabling significant extension of the potential window on the reduction side, in the fluoroalkylsilane, Y1 is more preferably represented by $C_nF_{2n+1}$ (5≤n≤10), and each of R1, R2, and R3 is more preferably independently represented by $OC_nH_{2n+1}$ (1≤n≤5) or $C_nH_{2n+1}$ (1≤n≤5). Further, it is more preferable that the fluorination ratio is 0.49 or higher. Specifically, the fluoroalkylsilane preferably includes at least one of $C_5F_{11}CH_2CH_2$—Si$(OCH_3)_3$, $C_6F_{13}CH_2CH_2$—Si$(OCH_3)_3$, and $C_8F_{17}CH_2CH_2$—Si$(OCH_3)_3$.

The content of the silane coupling agent is preferably in a range from 0.01% by mass to 10% by mass relative to the mass of the negative electrode active material. By setting the content of the silane coupling agent in the above-noted range, the potential window on the reduction side can be significantly extended. When the amount of the silane coupling agent is less than 0.01% by mass, it is difficult to completely cover the surface of the negative electrode active material with the coating derived from the silane coupling agent. Consequently, the coating derived from the silane coupling agent may not be able to block decomposition of the aqueous electrolyte solution, which may make it impossible to extend the potential window on the reduction side.

Examples of a method for adhering the silane coupling agent to the surface of the negative electrode active material include: a method in which a solution of the silane coupling agent is directly sprayed onto the negative electrode mixture layer of the negative electrode 23 and dried; a method in which a solution of the silane coupling agent is vaporized and the vaporized silane coupling agent is brought into contact with the negative electrode mixture layer of the negative electrode 23; and so on. Before adhering the silane coupling agent to the surface of the negative electrode active material, it is preferable to perform an ozone treatment on the negative electrode mixture layer containing the negative electrode active material, for the following reasons. By performing the ozone treatment, any organic coating adhered to the surface of the negative electrode active material can be removed, and hydrophilic functional groups can be imparted, so that the silane coupling agent can easily be adhered densely and uniformly to the surface of the negative electrode active material. As a result, the coating derived from the silane coupling agent via reductive decomposition becomes dense, and its electrochemical stability and water resistance can be enhanced. Example methods of the ozone treatment include UV ozone treatment, atmospheric plasma treatment, and the like. Among the foregoing, UV ozone treatment is preferable. UV ozone treatment can be performed using, for example, a UV cleaning/surface-modifying device (ASM1101N) (Asumi Giken Co., Ltd.). However, the treatment method and device are not limited to the above. It is noted that the silane coupling agent may be adhered to a powder of the negative electrode active material at a point before the manufacture of the negative electrode 23, or the silane coupling agent may be added to the slurry and thereby be adhered to the surface of the negative electrode active material.

After charging the secondary battery 20 of the present embodiment, the coating derived from the silane coupling agent and formed on the surface of the negative electrode active material contains, for example, components such as LiF, $SiO_x$ ($0<x<2$), $Li_2CO_3$, and $Li_2O$. It is considered that, by having LiF, $SiO_x$ ($0<x<2$), and the like included in the coating, the coating becomes electrochemically stable and is also configured to exhibit lithium-ion conductivity. Further, by containing fluorine, the ratio of low-solubility components can be increased, and robustness of the coating in the aqueous electrolyte solution can be enhanced. It is noted that, by using the above-described fluoroalkylsilane as the silane coupling agent, the ratio of LiF and $SiO_x$ ($0<x<2$) in the coating tends to become increased.

The above-noted $SiO_x$ is preferably such that valency of Si decreases in the coating from the surface side toward the deepest side. Further, it is preferable that the above-noted LiF is unevenly locally distributed toward the deepest side of the coating. Here, the deepest side of the coating denotes a side toward the area in contact with the surface of the negative electrode active material. These characteristics are achieved by, for example, using the above-described fluoroalkylsilane as the silane coupling agent. Further, a coating having these characteristics indicate that fluoroalkylsilane having a low degree of reduction remains in a surface layer on the electrolyte solution side, and due to the effect of the remaining fluoroalkylsilane having a low degree of reduction, water repellency of the surface layer on the electrolyte solution side can be enhanced. As a result, permeation of water into the coating and to the surface of the negative electrode active material can be suppressed, so that electrochemical and chemical stability can be increased, and robustness with respect to the aqueous electrolyte solution can be enhanced.

The separator 24 is not particularly limited so long as it allows lithium ions to pass through and has a function to electrically isolate the positive electrode and the negative electrode from each other, and, for example, a porous sheet made of a resin, an inorganic material, or the like is used. Specific examples of the porous sheet include a microporous thin film, a woven fabric, a non-woven fabric, and so on. Example materials of the separator include olefin resins such as polyethylene and polypropylene, polyamide, polyamide-imide, and cellulose. Examples of the inorganic material that constitutes the separator include glass and ceramics such as borosilicate glass, silica, alumina, and titania. The separator may be a laminate having a cellulose fiber layer and a fiber layer of thermoplastic resin such as olefin resin. Further, the separator may be a multilayer separator including a polyethylene layer and a polypropylene layer, and a separator having a surface coated with a material such as aramid resin or ceramic may also be used.

EXAMPLES

While the present disclosure will be further described by reference to Examples, the present disclosure is not limited to these Examples.

Example 1

[Negative Electrode]

Hard carbon serving as a negative electrode active material and PVDF serving as a binder material were mixed in N-methyl-2-pyrrolidone (NMP) in a solid content mass ratio of 96:4, so as to prepare a negative electrode mixture slurry. Next, the negative electrode mixture slurry was applied onto a negative electrode current collector made of copper foil. The applied film was dried and then rolled with a roller, and an electrode was thereby prepared.

A glass bottle containing a fluoroalkylsilane solution (composition: $CF_3(CF_2)_4CH_2CH_2$—Si—$(OCH_3)_3$), which is a silane coupling agent, and the electrode were placed in a metal container with a lid. This metal container was placed in a thermostatic chamber, and heated in a dry room environment (dew point: −40° C. or lower) at 120° C. for 12 hours. By this processing, the fluoroalkylsilane was volatilized and adhered to the surface of the negative electrode active material constituting the electrode. The electrode after the above processing was cut into a predetermined size, and a negative electrode was thereby obtained. The amount of applied film and the packing density of the negative electrode were 32.3 g/m² and 1.0 g cm⁻³, respectively.

[Positive Electrode]

$LiCoO_2$ serving as a positive electrode active material, carbon black serving as a conductive material, and PVdF serving as a binder material were mixed in NMP in a mass ratio of 94:3:3, so as to prepare a positive electrode mixture slurry. Next, the positive electrode mixture slurry was applied onto a positive electrode current collector made of Ti foil, and the applied film was dried and then rolled with a roller. Subsequently, the product was cut into a predetermined electrode size, and a positive electrode was thereby obtained. The amount of applied film and the packing density of the positive electrode were 65.0 g/cm² and 2.8 g cm⁻³, respectively.

[Electrolyte Solution]

An electrolyte solution in which lithium salt is dissolved in water was prepared by mixing lithium salts (LITFSI: LIBETI=0.7:0.3 (molar ratio)) and water so as to attain a molar ratio of 1:2.

[Three-Electrode Cell]

A three-electrode cell containing the above electrolyte solution was constructed by using the above negative electrode as the working electrode, the above positive electrode as the counter electrode, and Ag/AgCl (3M NaCl) as the reference electrode.

Example 2

A three-electrode cell was constructed in the same manner as in Example 1 except that, in preparing the negative electrode (i.e., working electrode), a fluoroalkylsilane solution (composition: $CF_3(CF_2)_7CH_2CH_2$—Si—$(OCH_3)_3$) was used as the silane coupling agent.

Comparative Example 1

A three-electrode cell was constructed in the same manner as in Example 1 except that, in preparing the negative electrode (i.e., working electrode), the processing of adhering fluoroalkylsilane to the surface of the negative electrode active material was not performed.

Comparative Example 2

A three-electrode cell was constructed in the same manner as in Example 1 except that, in preparing the negative electrode (i.e., working electrode), an alkylsilane solution (composition: $CH_3(CH_2)_6$—Si—$(OCH_3)_3$) was used as the silane coupling agent.

Comparative Example 3

A three-electrode cell was constructed in the same manner as in Example 1 except that, in preparing the negative electrode (i.e., working electrode), a fluoroalkylsilane solution (composition: $CF_3(CF_2)_3CH_2CH_2$—Si—$(OCH_3)_3$) was used as the silane coupling agent.

Cyclic voltammetry measurements were made for the three-electrode cells of Examples 1 and 2 and Comparative Examples 1 to 3, and their potential windows were evaluated.

Measurement Conditions

Initial potential: OCV

First turnaround potential: −3.238 V with respect to Ag/AgCl (3M NaCl) (0 V, as determined with reference to Li)

Second turnaround potential: −0.238V with respect to Ag/AgCl (3M NaCl) (3 V, as determined with reference to Li)

Number of cycles: 2 cycles

Sweep rate: 0.1 mV/sec

Measurement temperature: 25° C.

The potential window on the reduction side was read off in the second cycle by using −0.1 $mA/cm^2$ as the threshold.

Linear sweep voltammetry measurements were made for the three-electrode cell of each of the Examples and Comparative Examples after the above cyclic voltammetry measurement, and OCPs of the negative electrode were measured.

Measurement Conditions

Initial potential: OCV

Potential scanning range: −3.238 V~OCV with respect to Ag/AgCl (3M NaCl)

OCP measurement time: 30 minutes from after potential sweep to −3.238 V with respect to Ag/AgCl (3M NaCl)

Sweep rate: 0.1 mV/sec

Measurement temperature: 25° C.

Table 1 shows, for each of the Examples and Comparative Examples, the results concerning the reduction-side potential window, as well as OCP of the negative electrode after 0 minute (i.e., OCP after the potential sweep to −3.238 V), OCP of the negative electrode after 1 minute (i.e., OCP measured 1 minute after the potential sweep to −3.238 V), and OCP of the negative electrode after 10 minutes (i.e., OCP measured 10 minutes after the potential sweep to −3.238 V). All of the reduction-side potential window values and the negative electrode OCPs shown in Table 1 are values converted using lithium as the reference (i.e., values with respect to Li/Li+).

TABLE 1

| | Silane Coupling Agent | Reduction-Side Potential Window (V) | Negative Electrode OCP (V) | | |
|---|---|---|---|---|---|
| | | | After 0 Minute | After 1 Minute | After 10 Minutes |
| Example 1 | $CF_3(CF_2)_4CH_2CH_2$—Si—$(OCH_3)_3$ | 1.72 | 1.34 | 1.74 | 2.38 |
| Example 2 | $CF_3(CF_2)_7CH_2CH_2$—Si—$(OCH_3)_3$ | 0.64 | 0.96 | 1.25 | 1.75 |
| Comparative Example 1 | — | 2.03 | 1.61 | 2.14 | 2.86 |
| Comparative Example 2 | $CH_3(CH_2)_6$—Si—$(OCH_3)_3$ | 2.12 | 1.51 | 2.22 | 2.91 |
| Comparative Example 3 | $CF_3(CF_2)_3CH_2CH_2$—Si—$(OCH_3)_3$ | 2.11 | 1.58 | 2.06 | 2.68 |

As can be understood from Table 1, in Comparative Examples 1 to 3, the potential window on the reduction side was from 2.03 V to 2.12 V (as determined with reference to Li, or with respect to Li/Li+), and as such, the potential window on the reduction side was not extended. Meanwhile, in Example 1, the potential window on the reduction side was extended to 1.72 V (as determined with reference to Li, or with respect to Li/Li+), and in Example 2, the potential window on the reduction side was further extended to 0.64 V (as determined with reference to Li, or with respect to Li/Li+). Here, in Examples 1 and 2, a reduction peak was observed at about 2.5 V in the first cycle of cyclic voltammetry measurement. Considering that reductive decomposition of water starts from about 2V, the reduction peak observed at about 2.5V does not indicate generation of hydrogen due to reduction of water, i.e., the low-potential-side boundary of the potential window, but rather indicates that the silane coupling agent adhered to the surface of the negative electrode active material underwent reductive decomposition and formed a coating. Accordingly, as in Examples 1 and 2, by configuring such that a silane coupling agent which contains fluorine as a constituent element and which is reductively decomposed at a potential higher than the reductive decomposition potential of water is adhered to the surface of the negative electrode active material, the potential window on the reduction side can be extended in an aqueous electrolyte solution secondary battery.

In Comparative Example 1, since no silane coupling agent was adhered to the surface of the negative electrode active material and no coating derived from a silane coupling agent could be formed, the potential window was not extended, and self-discharge was not suppressed. In Comparative Example 2, although a silane coupling agent was adhered to the surface of the negative electrode active material, no fluorine was included as a constituent element of the silane coupling agent. Accordingly, a water-resistant coating containing fluorine and having a high ratio of low-solubility component could not be formed, so that the potential window was not extended, and self-discharge was not suppressed. In Comparative Example 3, although a fluoroalkylsilane containing fluorine as a constituent element was adhered to the surface of the negative electrode active material, the number of carbon atoms was 4, and the general formula of fluoroalkylsilane according to [Chemical Formula 1] was not satisfied. Accordingly, the fluoroalkylsilane was not reductively decomposed at a potential higher than the reductive decomposition potential of water, so that the potential window was not extended, and self-discharge was not suppressed. The fluorination ratio was 0.46, which is lower than 0.49.

In contrast, in Examples 1 and 2, a fluoroalkylsilane containing fluorine as a constituent element was adhered, and the number of carbon atoms was 5 and 8, respectively. Since the general formula of fluoroalkylsilane according to [Chemical Formula 1] was satisfied, the potential window extended, and self-discharge was suppressed. The fluorination ratio was 0.50 and 0.57, respectively, which are higher than or equal to 0.49. From the results of Examples 1 and 2, it can be confirmed that the potential window tends to become extended as the fluoroalkyl chain length increases. Further, from the results of Examples 1 and 2, it is confirmed that, as the fluoroalkyl chain length increases, the change in OCP of the negative electrode from after 0 minute to after 10 minutes becomes more gradual, which is due to the following reasons. By selecting a silane coupling agent with a higher fluorination ratio, the ratio of fluorine atoms in the coating can be increased, so that a water-resistant coating having a higher electrochemical stability and a higher ratio of low-solubility component can be formed, and robustness of the coating in the aqueous electrolyte solution can be enhanced.

In Examples 1 and 2, there was a coating formed on the surface of the negative electrode active material after testing, and by analyzing the coating by XPS, it was found that the coating was composed of components such as LiF and $SiO_x$. Here, in Comparative Examples 2 and 3, although a silane coupling agent was used, no clear peak due to reductive decomposition of the silane coupling agent was observed. It is presumed that this is because reductive decomposition of water and reductive decomposition of the silane coupling agent occurred in a competing manner, and the silane coupling agent was not reduced before reductive decomposition of water.

Further, as can be understood from Table 1, in Examples 1 and 2, the change in OCP of the negative electrode from after 0 minute to after 10 minutes was gradual. This indicates that occlusion of lithium ions into the negative electrode active material occurred, and also that the occluded lithium ions were accumulated in the negative electrode active material. On the other hand, in Comparative Examples 1 to 3, the change in OCP of the negative electrode from after 0 minute to after 10 minutes was rapid. This indicates that occlusion of lithium ions hardly occurred, or even if occurred, the occluded lithium ions were not accumulated in the negative electrode active material but rather released instantaneously. In other words, it can be said that, in Examples 1 and 2, self-discharge is suppressed as compared to Comparative Examples 1 to 3.

REFERENCE SIGNS LIST 20 secondary battery
21 battery housing
22 positive electrode
23 negative electrode
24 separator
25 gasket
26 sealing plate
27 electrolyte solution
30 negative electrode current collector

The invention claimed is:
1. A secondary battery comprising a positive electrode, a negative electrode, and an electrolyte solution, wherein
the electrolyte solution contains water and a lithium salt; and
the negative electrode includes a negative electrode active material, wherein, to a surface of the negative electrode active material, a silane coupling agent is adhered, which is reductively decomposed at a potential higher than a reductive decomposition potential of water, and wherein the silane coupling agent contains fluorine as a constituent element,
wherein the silane coupling agent is fluoroalkylsilane represented by

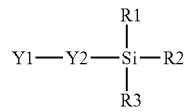

Chemical Formula

Y1 is represented by $C_nF_{2n+1}$ (5≤n≤10); Y2 is represented by $(CH2)_n$ where n is an integer of 0 to 5, and may be linear or branched; and each of R1, R2 and R3 independently is an alkoxy group, an alkyl group, an amino group, a halogen atom, or a hydrogen atom, and
wherein the electrolyte solution contains 4 mol or less of the water relative to 1 mol of the lithium salt,
wherein the fluoroalkylsilane has a fluorination ratio of 0.49 or higher.
2. The secondary battery according to claim 1, wherein the negative electrode active material contains a carbon material as a main component.
3. The secondary battery according to claim 1, wherein a reduction decomposition potential of the silane coupling agent is 2.1 V or higher as determined with reference to Li.
4. The secondary battery according to claim 1, wherein each of R1, R2, and R3 is independently represented by $OC_nH_{2n+1}$ (1≤n≤5) or $C_nH_{2n+1}$ (1≤n≤5).
5. The secondary battery according to claim 1, wherein the fluoroalkylsilane includes at least one of $C_5F_{11}CH_2CH_2$—$Si(OCH_3)_3$, $C_6F_{13}CH_2CH_2$—$Si(OCH_3)_3$, and $C_8F_{17}CH_2CH_2$—$Si(OCH_3)_3$.
6. The secondary battery according to claim 1, wherein a content of the silane coupling agent is in a range from 0.01% by mass to 10% by mass relative to a mass of the negative electrode active material.
7. A secondary battery comprising a positive electrode, a negative electrode, and an electrolyte solution, wherein
the electrolyte solution contains water and a lithium salt; and
the negative electrode includes a negative electrode active material, and on a surface of the negative electrode active material, a coating is formed by reductive decomposition of a silane coupling agent which contains fluorine as a constituent element and which is reductively decomposed at a potential higher than a reductive decomposition potential of water, wherein the silane coupling agent is fluoroalkylsilane represented by

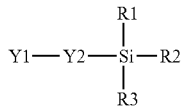

Chemical Formula 5

Y1 is represented by $C_nF_{2n+1}$ (5≤n≤10); Y2 is represented by $(CH2)_n$ where n is an integer of 0 to 5, and may be linear or branched; and each of R1, R2 and R3 independently is an alkoxy group, an alkyl group, an amino group, a halogen atom, or a hydrogen atom.

8. The secondary battery according to claim 7, wherein the coating includes LiF and $SiO_x$ (0<x<2).

9. The secondary battery according to claim 8, wherein the $SiO_x$ is such that valency of Si decreases in the coating from a surface side toward a deepest side.

10. The secondary battery according to claim 8, wherein the LiF is unevenly locally distributed toward the deepest side of the coating.

11. The secondary battery according to claim 1, wherein the lithium salt includes a salt having a lithium ion and an imide anion.

12. The secondary battery according to claim 1, wherein the lithium salt includes lithium bis(trifluoromethanesulfonyl)imide, LiTFSI.

13. The secondary battery according to claim 1, wherein the electrolyte solution contains 6% by mass to 50% by mass of the water.

14. The secondary battery according to claim 7, wherein the lithium salt includes a salt having a lithium ion and an imide anion.

15. The secondary battery according to claim 7, wherein the lithium salt includes lithium bis(trifluoromethanesulfonyl)imide, LiTFSI.

16. The secondary battery according to claim 7, wherein the electrolyte solution contains 6% by mass to 50% by mass of the water.

17. The secondary battery according to claim 7, wherein the electrolyte solution contains 4 mol or less of the water relative to 1 mol of the lithium salt.

* * * * *